United States Patent
Lee

(10) Patent No.: US 9,495,362 B2
(45) Date of Patent: Nov. 15, 2016

(54) FRAGMENTED VIDEO SYSTEMS

(71) Applicant: Pui Shan Xanaz Lee, Kowloon (HK)

(72) Inventor: Pui Shan Xanaz Lee, Kowloon (HK)

( * ) Notice: Subject to any disclaimer, the term of this patent is extended or adjusted under 35 U.S.C. 154(b) by 140 days.

(21) Appl. No.: 14/475,428

(22) Filed: Sep. 2, 2014

(65) Prior Publication Data

US 2016/0062990 A1 Mar. 3, 2016

(51) Int. Cl.
| | | |
|---|---|---|
| *G06F 17/28* | (2006.01) | |
| *G06F 17/20* | (2006.01) | |
| *G06F 17/27* | (2006.01) | |
| *H04N 7/15* | (2006.01) | |
| *G06T 11/60* | (2006.01) | |
| *G06Q 50/00* | (2012.01) | |
| *G10H 1/36* | (2006.01) | |
| *H04R 27/00* | (2006.01) | |

(52) U.S. Cl.
CPC ............ *G06F 17/289* (2013.01); *G06Q 50/01* (2013.01); *G06T 11/60* (2013.01); *G10H 1/365* (2013.01); *H04N 7/15* (2013.01); *G10H 2230/015* (2013.01); *G10H 2240/125* (2013.01); *G10H 2240/175* (2013.01); *H04R 27/00* (2013.01); *H04R 2227/003* (2013.01); *H04R 2410/00* (2013.01); *H04R 2420/07* (2013.01); *H04R 2499/11* (2013.01)

(58) Field of Classification Search
None
See application file for complete search history.

(56) References Cited

U.S. PATENT DOCUMENTS

| | | | | |
|---|---|---|---|---|
| 5,484,291 A | * | 1/1996 | Nakai | G09B 15/00 386/285 |
| 7,068,596 B1 | * | 6/2006 | Mou | H04L 29/06027 370/229 |
| 2005/0076376 A1 | * | 4/2005 | Lind | H04N 7/163 725/87 |
| 2006/0215562 A1 | * | 9/2006 | Mou | H04L 29/06027 370/235 |
| 2007/0202480 A1 | * | 8/2007 | Steele | G09B 19/00 434/307 A |
| 2008/0183487 A1 | * | 7/2008 | Wachi | G06Q 30/02 705/26.1 |
| 2009/0165634 A1 | * | 7/2009 | Mahowald | G10H 1/368 84/610 |
| 2011/0126103 A1 | * | 5/2011 | Cohen | G10H 1/365 715/716 |

* cited by examiner

*Primary Examiner* — Marcus T Riley

(57) ABSTRACT

According to embodiments of the invention, systems, methods and devices are provided for a plurality of participants speaking different languages to participate in a singing event by using pre-determined song samples of different languages. In one embodiment, a system is provided that includes a storage that identifies songs by using samples from the song. The storage contains a song including both text and melody, wherein the song contains a plurality of versions of different languages. The system also includes devices allowing superiors and subordinates speaking different languages to sing at the same time. The collaboration may then be recorded and stored remotely via a cloud-based server.

3 Claims, 2 Drawing Sheets

FRAGMENTED VIDEO SYSTEMS

FIELD OF THE INVENTION

This invention generally relates to communication based on video systems. Specifically, this invention relates to allowing users to communicate each other via devices, and enabling such users to sing songs in a single event without a language barrier.

BACKGROUND OF THE INVENTION

Singing in a group is gaining popularity. This becomes a part of a culture as social activities as one to two participants can perform in front of a group of people to sing their preferred songs. This current means of singing has multiple limitations. First, the number of participants can sing in front of the group is limited. Secondly, language can become a barrier if the singers come from different countries. To participate in such a singing activity, more people from other nationalities should be able to join in, particularly in a multi-cultural environment such as a large international company. For example, certain staff may speak one language while others speak a different language. In such a case, having the different language speakers to join in a single event can be challenge, as the enjoyment will be greatly reduced because of the language barrier. Therefore, methods and systems that can accommodate speakers of different languages to sing at the same time are greatly appreciated. Commonly, in collaboration, multiple singers would generally participate. These singers typically must be physically present at the same time in the same location. However, for those who have prior commitment with studies and work, committing to practice at a single location may be difficult. It is, therefore, desirable to be able to have singers in different places be able to collaborate on a single musical piece, regardless of the native languages of the singers.

Therefore, it is an objective of the disclosed technology to provide fragmented video systems for facilitating real-time collaboration, translation and synchronization of lyrics being sang or spoken by different users of different native languages.

SUMMARY OF THE INVENTION

According to embodiments of the invention, systems, methods and devices are provided for a plurality of participants speaking different languages to participate in a singing event by using pre-determined song samples of different languages. In one embodiment, a system is provided that includes a storage that identifies songs by using samples from the song. The storage contains a song including both text and melody, wherein the song contains a plurality of versions of different languages. The system also includes devices allowing superiors and subordinates speaking different languages to sing at the same time. The collaboration may then be recorded and stored remotely via a cloud-based server.

In an embodiment of the disclosed invention, a system is used for facilitating synchronization of a plurality of participants of different languages to participate in a singing event by using pre-determined song samples of different languages. The singers may be located spatially and geographically at different points around the world. The system may have one or more of the following components: a) a storage for identifying songs using samples of the songs, wherein the storage contains a song having text and a melody, wherein the text of the song in stored in a plurality of different languages, further wherein the melody is severable from the text; b) a first device having a microphone serving as a superior device which facilitates a superior to sing the words of the song in a first language, and play the melody of the song through a digital piano keyboard included in the first device; c) second device having a display serving as a first client device which displays the text of the song to a subordinate in a second language and plays the song including both the text and the melody, in the second language; d) a third device having a display serving as a second client device which displays the text of the song, wherein the text is displayed to a subordinate in a third language plays the song, including both the text and the melody, in the third language; and/or e) a unit included in the first device.

The unit may carry out the a method, not necessarily in the following order, by: a) detecting, from the microphone, that the superior has sung the song in the first language on the first device; b) receiving the song, in parts, in text from the superior, wherein the text is in the first language; c) extracting an acoustic fingerprint sample from the song in the text received from the superior; d) searching the audio database for the full text of the song based on the acoustic fingerprint sample, wherein the searched full text is in the second language on the second device and in the third language on the third device; e) after searching, sending the searched full text in the second language to the second device to be displayed in the second language; and/or f) sending the searched full text in the third language to the secondary, allowing the third device to display the full in the third language.

The unit may also carry out a step of detecting, from the microphone, that the superior has used the digital keyboard to play the melody of the song on the first device. The step of detecting may include: a) receiving the melody, in parts, from the superior, when the superior uses the keyboard to play the song; b) extracting a second acoustic fingerprint sample from the melody performed by the superior; c) searching the audio database for the full song based on the second acoustic fingerprint sample, wherein the text of the searched full song is displayed in the second language on the second device and in the third language on the third device; d) after searching, sending the searched full song to the second device, and playing the searched full song on the second device while displaying the text in the second language; and/or e) sending the searched full song to the third device, and playing the searched full song on the third device while displaying the text in the third language.

In a further embodiment of the disclosed system, the first and second devices may display the respective second and third languages in a karaoke arrangement. That is, the words mays scroll across the screen in similar fashion to a karaoke system in the particular language of the singer.

Still further, the first, second, and/or third users may sing, in their respective native languages, the text that is being scrolled or displayed on their device in a karaoke manner. Furthermore, the devices used may include, but are not limited to home media players, mobile phones, tablet computers, laptop computers, desktop computers, e-readers, personal digital assistants ("PDA") and/or any other electronic device capable of communicating with other devices over any type of network.

In accordance with these and other objects which will become apparent hereinafter, the invention will now be described with particular reference to the drawings.

DETAILED DESCRIPTION

According to embodiments of the invention, systems, methods and devices are provided for a plurality of participants speaking different languages to participate in a singing event by using pre-determined song samples of different languages. In one embodiment, a system is provided that includes a storage that identifies songs by using samples from the song. The storage contains a song including both text and melody, wherein the song contains a plurality of versions of different languages. The system also includes devices allowing superiors and subordinates speaking different languages to sing at the same time. The collaboration may then be recorded and stored remotely via a cloud-based server.

Referring now to the figures, a cloud-based or server-based system is used for facilitating real-time collaboration, translation and synchronization of lyrical output. A "system" and/or a "server" may be any device having one or more inputs and outputs, and is used to exemplary purposes. Thus, the terms "system" and "server" are not meant to be limiting in any manner.

Figure 1:
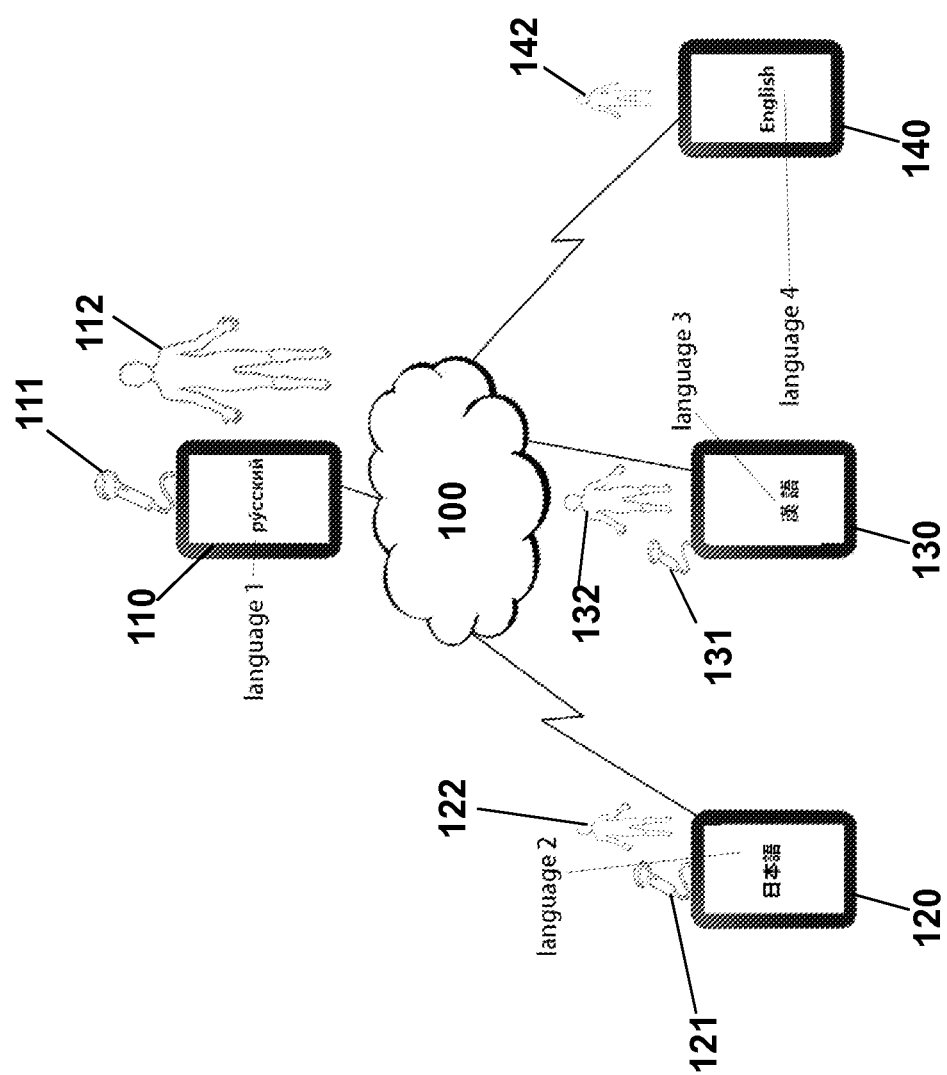
FIG. 1 is a generalized overview a singing event system configuration according to an embodiment of the disclosed technology.

FIG. 1 is a generalized overview of a singing event system configuration according to an embodiment of the disclosed technology. The system 100, may be a central communication node for receiving, interpreting, encrypting, displaying, and/or send data. The data may include media such as audio, text, video, and imagery. The system 100 may be any device, such as a computing device, that is capable of carrying out functions using a processor, memory and/or any other necessary components. The system 100 may be a remotely located server that is accessible via a network. As such, the system 100 may be cloud-based, as depicted in FIG. 1, insofar as the system may be operable via network connections from various devices located at various locations.

The system 100 may be managed by a superior or leader 112 or by any other user. The superior 112 may fill the role of the typical conductor or lead singer of a group. The superior 112 may have an associated multifunctional media device 110 for sending and receiving data, signals, directions, and video/audio feeds. The device 110 of the leader 111 may be used to send this data to other multifunctional media devices 120, 130, 140 associated with other singers and/or backup vocalists of a group.

The multifunctional media devices 110, 120, 130 & 140 may be mobile devices, tablet computers, desktop computers, laptop computers, or any other device that is capable of capturing, sending and receiving data and media over a network, displaying text/imagery on a screen, and/or playing audio using a sound-emitting component such as a speaker. The communication between the leader's multifunctional media player 110 and the other multifunctional media devices is carried out via the cloud-based system 100. The communication may occur over a local area network (LAN), wide area network (WAN), packet-switch data network, or any other network suitable for sending and receiving data.

One or more other singers 122, 132, 142 may be located within a range of one of their respective devices 120, 130, 140. The range may be defined as being sufficiently close to the device such that the media player may capture audio sang by the user. Each of the devices 110, 120, 130, 140 may display text and/or lyrics in a language chosen by the particular user. Thus, in FIG. 1, device 110 displays text written in language 1, which in this case, is Russian. Device 120 displays text written in language 2, which in this case is Japanese. Further, device 130 displays language 3 which is Chinese, and device 140 displays language 4, which is English. As such, singers having different native origins and languages can still collaborate together on songs. The language being spoken or sang by a given user is therefore translated in real-time into the native languages of the respective users.

Thus, members of a band, orchestra or group may collaborate and synchronize music from locations all around the world in real-time. The system 100 may be capable of ensuring a smooth synchronization and collaboration in order to compensate for any connection disruptions, network slowdowns, and/or bandwidth fluctuations. Thus, the singers may be located spatially and geographically at different points around the world.

Figure 2:
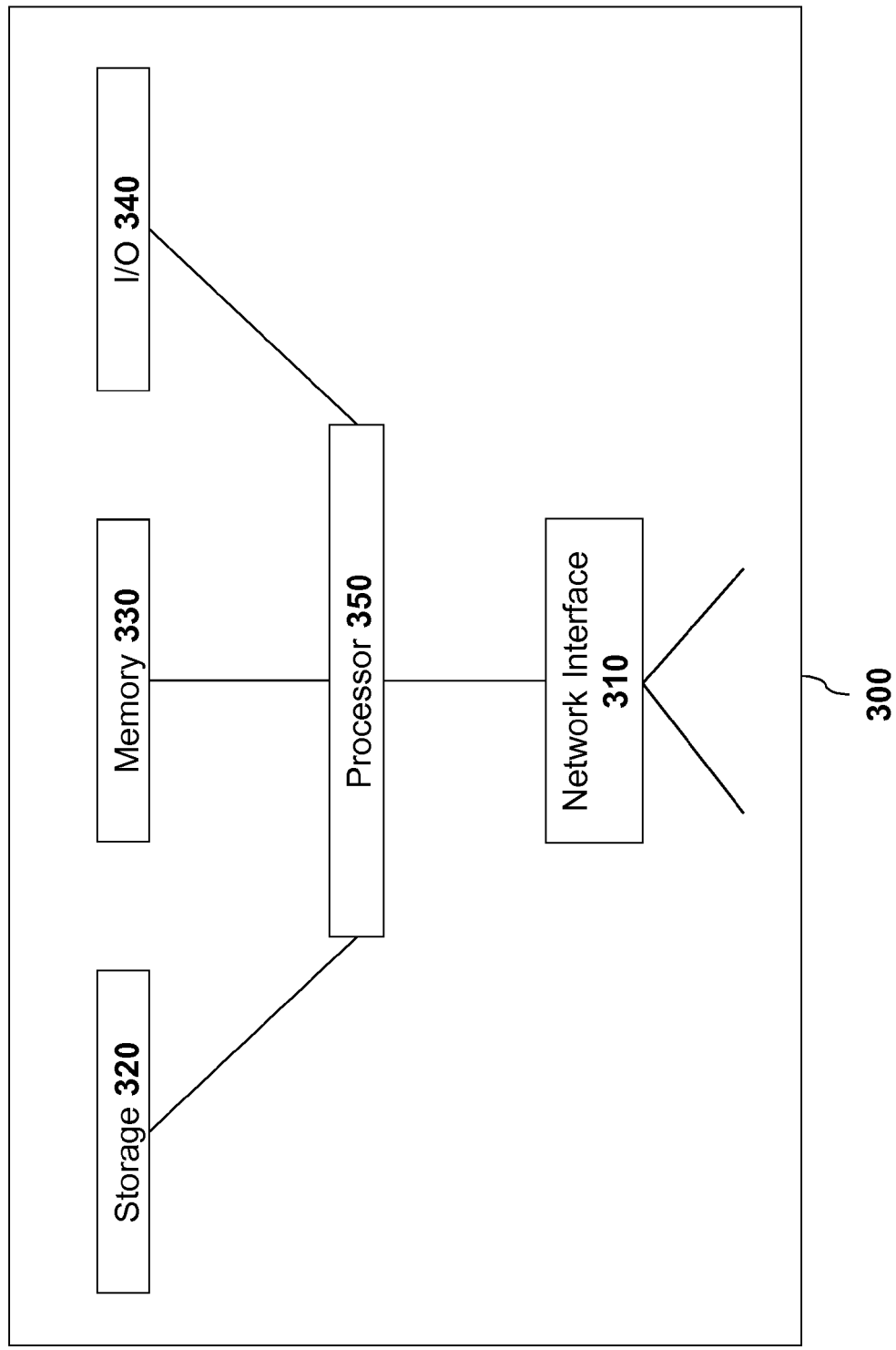
FIG. 2 is a high-level block diagram of a microprocessor device that may be used to carry out the disclosed technology.

FIG. 2 is a high-level block diagram of a microprocessor device that may be used to carry out the disclosed technology. The device 300 may or may not be a computing device. The device 300 comprises a processor 350 that controls the overall operation of a computer by executing the reader's program instructions which define such operation. The device's program instructions may be stored in a storage device 320 (e.g., magnetic disk, database) and loaded into memory 330 when execution of the console's program instructions is desired. Thus, the device's operation will be defined by its program instructions stored in memory 330 and/or storage 320, and the console will be controlled by the processor 350 executing the console's program instructions.

The device 300 may also include one or a plurality of input network interfaces for communicating with other devices via a network (e.g., the internet). The device 300 further includes an electrical input interface for receiving power and data from a power or wireless data source. The device 300 may also include one or more output network interfaces 310 for communicating with other devices. The device 300 may also include input/output 340 representing devices which allow for user interaction with a computer (e.g., display, keyboard, mouse, speakers, buttons, etc.).

One skilled in the art will recognize that an implementation of an actual device will contain other components as well, and that FIG. 2 is a high level representation of some of the components of such a device for illustrative purposes. It should also be understood by one skilled in the art that the devices depicted and described with respect to FIG. 1 may be implemented on a device such as is shown in FIG. 2. Thus, the device 300 of FIG. 2 may describe the inner workings of any of the devices 110, 120, 130, 140 and/or the server on which the cloud-based system 100 is hosted.

While the disclosed invention has been taught with specific reference to the above embodiments, a person having ordinary skill in the art will recognize that changes can be made in form and detail without departing from the spirit and the scope of the invention. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

The invention claimed is:
1. A system for facilitating a plurality of participants of different languages to simultaneously participate in a singing event by using pre-determined song samples of different languages, comprising:
- a storage for identifying songs using samples of the songs, wherein the storage contains:
  - a song having text and a melody, wherein the text of the song is stored in a plurality of different languages, further wherein the melody is severable from the text;
- a first device having a microphone serving as a superior device, wherein the first device facilitates a superior to:
  - sing the text of the song in a first language; and
  - play the melody of the song through a digital piano keyboard included in the first device;
- a second device having a display serving as a first client device, wherein the second device:
  - displays the text of the song, wherein the text is displayed to a subordinate in a second language; and
  - plays the song including both the text and the melody, wherein the text is displayed in the second language;
- a third device having a display serving as a second client device, wherein the third device:
  - displays the text of the song, wherein the text is displayed to a second subordinate in a third language; and
  - plays the song including both the text and the melody, wherein the text is displayed in the third language;
- a unit included in the first device, wherein the unit is adapted for:
  - detecting, from the microphone, that the superior has sung the song in the first language on the first device, wherein the detecting includes:
    - receiving the song, in parts, in text from the superior, wherein the received text is in the first language;
    - extracting an acoustic fingerprint sample from the song in the text received from the superior;
    - searching the storage for the song based on the acoustic fingerprint sample
    - sending the searched text in the second language to the second device to be displayed in the second language;
    - sending the searched text in the third language to the third device to be displayed in the third language; and
  - detecting, from the microphone, that the superior has used the digital piano keyboard to play the melody of the song on the first device, wherein the detecting includes:
    - receiving the melody, in parts, from the superior, when the superior uses the keyboard to play the song;
    - extracting a second acoustic fingerprint sample from the melody performed by the superior;
    - searching the storage for the song based on the second acoustic fingerprint sample, wherein the text of the searched song is displayed in the second language on the second device and in the third language on the third device; and
    - after searching, sending the searched song to the second device, and playing the searched song on the second device while displaying the text in the second language; and
    - sending the searched song to the third device, and playing the searched song on the third device while displaying the text in the third language.

2. A system allowing a plurality of participants of different languages to simultaneously participate in a singing event by using pre-determined song samples of different languages, comprising:
- an audio database for locating songs by using acoustic fingerprint samples, wherein the audio database contains:
  - a song having text and a melody, wherein the text of the song is stored in a plurality of different languages, further wherein the melody is severable from the text;
- a first device having a microphone serving as a superior device, wherein the first device facilitates a superior to:
  - sing the text of the song in a first language; and
  - play the melody of the song through a digital piano keyboard included in the first device;
- a second device having a display serving as a first client device, wherein the second device:
  - displays the text of the song, wherein the text is displayed to a subordinate in a second language; and
  - plays the song including both the text and the melody, wherein the text is displayed in the second language;
- a third device having a display serving as a second client device, wherein the third device:
  - displays the text of the song, wherein the text is displayed to a second subordinate in a third language; and
  - plays the song including both the text and the melody, wherein the text is displayed hi the third language;
- a unit included in the first device, wherein the unit is adapted for:
  - detecting, from the microphone, that the superior has sung the song in the first language on the first device, wherein the detecting includes:
    - receiving the song, in parts, in text from the superior, wherein the received text is in the first language;
    - extracting an acoustic fingerprint sample from the song in the text received from the superior;
    - searching the audio database for the song based on the acoustic fingerprint sample
    - sending the searched text in the second language to the second device to be displayed in the second language in a karaoke arrangement; and
    - sending the searched full text in the third language to the third device to be displayed in the third language in a karaoke arrangement; and
  - detecting, from the microphone, that the superior has used the digital piano keyboard to play the melody of the song on the first device, wherein the detecting includes:
    - receiving the melody, in parts, from the superior, when the superior uses the keyboard to play the song;
    - extracting a second acoustic fingerprint sample from the melody performed by the superior;
    - searching the audio database for the song based on the second acoustic fingerprint sample, wherein the text of the searched song is displayed in the second language on the second device and in the third language on the third device;
    - after searching, sending the searched song to the second device, and playing the searched song on the second device while displaying the text in the second language; and
sending the searched song to the third device, and playing the searched song on the third device while displaying the text in the third language.

3. A system allowing a plurality of participants of different languages to simultaneously participate in a singing event by using pre-determined song samples of different languages, comprising:
- an audio database for locating songs by using acoustic fingerprint samples, wherein the audio database contains:
  - a song having text and a melody, wherein the text of the song is stored in a plurality of different languages, further wherein the melody is severable from the text;
- a first device having a microphone serving as a superior device, wherein the first device facilitates a superior to:
  - sing the text of the song in a first language; and
  - play the melody of the song through a digital piano keyboard included in the first device;
- a second device having a display serving as a first client device, wherein the second device:
  - displays the text of the song, wherein the text is displayed to a subordinate in a second language; and
  - plays the song including both the text and the melody, wherein the text is displayed in the second language;
- a third device having a display serving as a second client device, wherein the third device:
  - displays the text of the song, wherein the text is displayed to a second subordinate in a third language; and
  - plays the song including both the text and the melody, wherein the text is displayed in the third language;
- a unit included in the first device, wherein the unit is adapted for:
  - detecting, from the microphone, that the superior has sung the song in the first language on the first device, wherein the detecting includes:
    - receiving the song, in parts, in text from the superior, wherein the text is in the first language;
    - extracting an acoustic fingerprint sample from the song in the text received from the superior;
    - searching the audio database for the song based on the acoustic fingerprint sample
    - sending the searched text in the second language to the second device to be displayed in the second language in a karaoke arrangement and sang in a karaoke manner; and
    - sending the searched text in the third language to the third device to be displayed in the second language in a karaoke arrangement and sang in a karaoke manner;
  - detecting, from the microphone, that the superior has used the digital piano keyboard to play the melody of the song on the first device, wherein the detecting includes:
    - receiving the melody, in parts, from the superior, when the superior uses the keyboard to play the song;
    - extracting a second acoustic fingerprint sample from the melody performed by the superior;
    - searching the audio database for the song based on the second acoustic fingerprint sample, wherein the text of the searched song is displayed in the second language on the second device and in the third language on the third device; and
    - after searching, sending the searched song to the second device, and playing the searched song on the second device while displaying the text in the second language; and
- sending the searched song to the third device, and playing the searched song on the third device while displaying the text in the third language.

* * * * *